C. P. S. Wardwell,
Circular Sawing Machine.
Nº 16,814.    Patented Mar. 10, 1857.
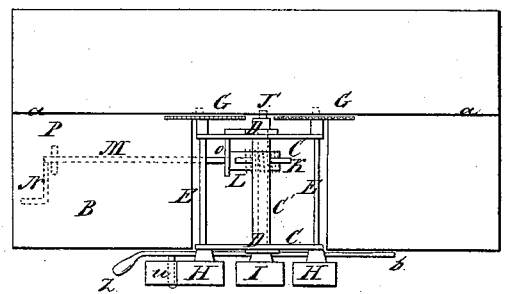
Fig. 1.
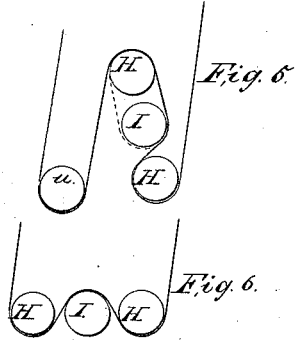
Fig. 6.
Fig. 6.
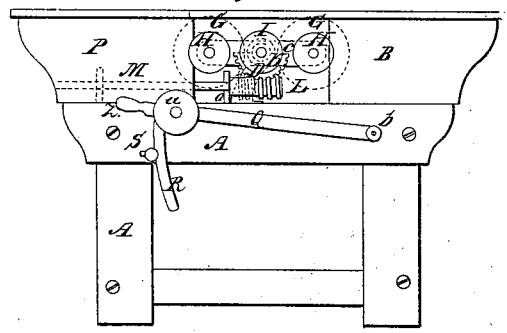
Fig. 2.
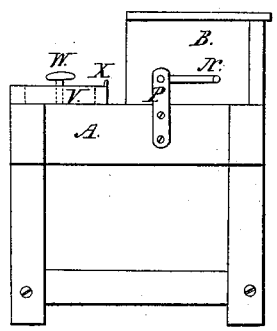
Fig. 4.
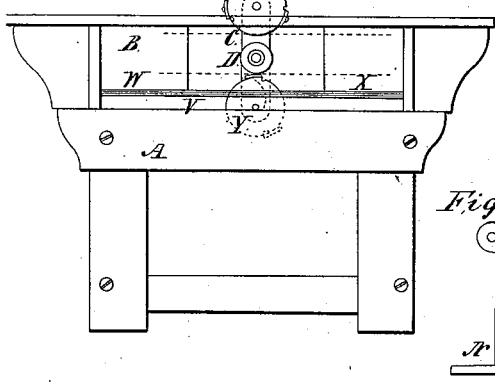
Fig. 3.
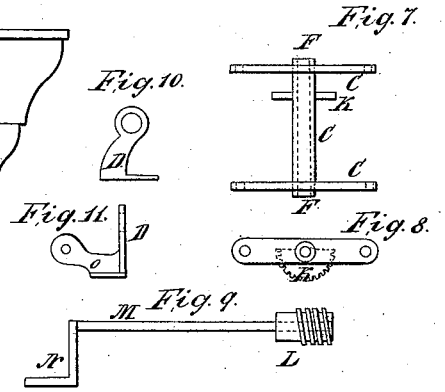
Fig. 7.
Fig. 10.
Fig. 11.
Fig. 8.
Fig. 9.
Witnesses.
Daniel E. True
John Aldrich Jr.
Inventor.
C. P. S. Wardwell

UNITED STATES PATENT OFFICE.

C. P. S. WARDWELL, OF LAKE VILLAGE, NEW HAMPSHIRE.

CIRCULAR SAWING MACHINE.

Specification of Letters Patent No. 16,814, dated March 10, 1857.

*To all whom it may concern:*

Be it known that I, C. P. S. WARDWELL, of Lake Village, in the county of Belknap and State of New Hampshire, have invented a new and Improved Method of Hanging and Adjusting Circular Saws, Tenoning Cylinders or Cutters, or other Similar Cutting Instruments; and I do hereby declare that the following is a full and exact description thereof, reference being had to the accompanying drawings and to the letters of reference marked thereon.

The nature of my invention consists in hanging two or more circular saws, a cutting off, and a splitting saw, in a swing frame in such a manner that when it is desired to use the splitting saw, it can be raised to project any required distance above the table, at the same time the cutting off saw is below the table out of the way; when it is desired to use the cutting-off saw, that is raised and adjusted as desired, the splitting saw at the same time falls below the table out of the way.

To enable others skilled in the art to make and use my invention, I will proceed to describe its construction and operation:—

Figure 1, is a top view with a section of the table removed. Fig. 2, is a side view, right-hand side. Fig. 3, is a left-hand side view, with a portion of the table removed, showing two cylinder cutters substituted for the saws and to be used for tenoning. Fig. 4, is an end view of the frame, with a part of the table removed for tenoning. Fig. 5, shows the manner of belting when used for tenoning. Fig. 6, represents the manner of belting for using the saws. Fig. 7, is a top view of the swing frame ready to receive the arbors for the saws. Fig. 8, is an end view of the same. Fig. 9, is the crank shaft and screw. Fig. 10, is a side view of the standard for supporting the swing frame. Fig. 11, is a view of a standard edgewise.

Similar letters of reference indicate corresponding parts of the several figures.

A, is a frame surmounted by an elevated table B. This table is made in two parts, being divided on a line with the saws as shown by line *a*, *a*, Fig. 1.

C, C, C, Figs. 1, and 7, is a top view of a swing frame resembling a letter H, viz., consisting of two parallel bars or arms connected in the middle by a tube which projects through the arms and form (hollow) journals by which the frame is supported and swings. F, F, Fig. 7, show the journals; this frame has boxes in the end of the arms to receive two arbors, E, E, Fig. 1; these arbors carry two saws G, G, one of which is a splitting saw, the other a cutting-off saw; they are driven by pulleys H, H. J, is also an arbor which runs inside of the tube of the swing frame and around which arbors E, E, move when the swing frame is being adjusted, and is driven by pulley I, Figs. 1, and 2. Arbor J, is to carry a cutter for cutting double tenons as will be described hereinafter its pulley also answers to deviate the belt so as to have a longer bearing on pulleys H, H, as shown by Fig. 6, swing frame C, C, C, with arbors E, E, and J, saws G, G, and C, are supported by two standards D, D, which are firmly attached to frame A, by their lower ends, the upper ends having boxes to receive journals F, F, of the swing frame as shown by Fig. 7.

Fig. 10, is a side view of standards, D, D, K, Figs. 1, 2, and 7, is a gear which is firmly attached to the tube of swing frame C, C, C, near its inner end or arm.

Fig. 8, is an end view of the swing frame *c*, *c*, *c*, showing the gear K.

L, Figs. 1, and 2, is a screw, which runs in and operates gear K, this screw is attached to the end of a shaft M, on the outer end of which is a crank N. The shaft M, is supported by, and runs in, bearings P, at the end near crank N, and O, near the screw L.

Fig. 9, is a view of screw L, shaft M, and crank N. Shaft M, extends to the front end of the frame A; and bearing P, and crank N, are on the outside of frame A, as shown by Fig. 4. Bearing O, of shaft M, is attached to the inner or right-hand side of the standard D, which is next to the saws; this bearing is shown by Fig. 11, which is an edgewise view of standard D.

U, Figs. 1, and 2, is a tightening pulley to be used only when the machine is used for tenoning. This pulley is attached to lever Q, near the handle Z; the opposite end of the lever is attached to the frame by screw *b*, on which it turns and is held in position by segment R, and thumb screw S.

Y, Y, Fig. 3, shows two cylinder cutters substituted for saws to be used for tenoning.

X, is a track on frame V, upon which any well known kind of carriage is to be placed to feed or slide timber to be operated on, to the cutters, the frame V, being hinged at one end the opposite end can be raised or adjusted by means of a screw W, Figs. 3, and 4.

When this machine is used for sawing, it is to be belted as shown by Fig. 6, it may be belted from above or below. When used for tenoning, it is to be belted as shown by Fig. 5.

I will now describe its operation. When used for sawing, put a cutting off saw on one arbor, and a splitting saw on the other; then raise the saw it is desired to use, above the table by turning the crank N, by which the saws can be adjusted to cut any required depth. Instead of saws cutters may be used for grooving, sticking, planing, &c. When it is desired to cut double tenons put any well known cutters on arbors, E, E, instead of saws; also any suitable cutter on arbor J, (which runs in the tube,) for cutting the space between the tenons, then adjust the thickness of the tenons by the crank N by bringing one cutter above the axis on which the frame swings, which drops the other below, as shown by Fig. 3, which represents the cutters Y Y on a perpendicular line and the red lines touching their inner peripheries denote the greatest thickness they can cut; but as soon as the cutters Y, Y, begin to assume a horizontal position the horizontal lines will begin to approach each other, by which means the thickness of the tenons is regulated; place any suitable table upon the frame V and regulate the depth of the shoulder of the tenon by means of the screw W; belt as shown by Fig. 5, the red line of which shows a belt from pulley H, to pulley I, to drive arbor J, with sufficient power. When it is desired to cut single tenons the cutters may be put on to any two of the arbors but if used on arbors E, E, the short belt shown by red from H to I, Fig. 5, may be dispensed with, also the cutter on arbor J.

This manner of hanging saws allows one saw bench to answer every purpose of two separate ones it also obviates the necessity of changing a splitting for a cutting-off saw and vice versa, which is necessary where but one arbor is used in a saw bench. It also possesses the great advantage of being used for tenoning with the trifling expense of cylinder cutters, or with saws, as it is constituting and combining in one machine a saw bench for cutting-off and splitting, also for single or double tenoning.

What I claim as my invention and desire to secure by Letters Patent, is—

The arrangement of two or more saws or cutters, in a swinging frame so that either saw or cutter may be brought into a suitable position for action, while at the same time, the other or others shall be removed from the way, in the manner specified, or in any equivalent manner; and this I claim whether or not, a central or axial saw or cutter is combined therewith, or with a single swinging saw or cutter.

C. P. S. WARDWELL.

Witnesses:
 DANIEL E. TRUE,
 JOHN ALDRICH, Jr.